United States Patent [19]

Dickson et al.

[11] Patent Number: 5,331,445
[45] Date of Patent: Jul. 19, 1994

[54] INCREASED BRAGG ANGLE SENSITIVITY HOLOGRAM SYSTEM AND METHOD

[75] Inventors: LeRoy D. Dickson, Morgan Hill; Matthias C. Krantz, San Jose, both of Calif.

[73] Assignee: International Business Machines Corporation, Armonk, N.Y.

[21] Appl. No.: 931,635

[22] Filed: Aug. 18, 1992

[51] Int. Cl.⁵ .................. G02B 5/32; G03H 1/28; G11B 7/12
[52] U.S. Cl. .................. 359/15; 359/1; 359/24; 365/125; 369/103
[58] Field of Search ............... 359/1, 15, 24, 19, 485, 359/483, 487, 488, 566, 558; 369/103, 109, 110; 365/125

[56] References Cited

U.S. PATENT DOCUMENTS

| | | | |
|---|---|---|---|
| 4,497,534 | 2/1985 | Sincerbox et al. | 359/19 |
| 4,993,789 | 2/1991 | Biles et al. | 359/15 |
| 5,013,107 | 5/1991 | Biles | 359/15 |
| 5,085,496 | 2/1992 | Yoshida et al. | 359/485 |

FOREIGN PATENT DOCUMENTS

| | | | |
|---|---|---|---|
| 0350014 | 10/1990 | European Pat. Off. | G03H 1/02 |
| 61-42613 | 3/1986 | Japan | G02B 26/02 |
| 61-123032 | 6/1986 | Japan | G11B 7/135 |
| 62-219340 | 9/1987 | Japan | G11B 7/135 |
| 63-25845 | 2/1988 | Japan | G11B 7/135 |
| 113246 | 1/1989 | Japan | G11B 11/10 |
| 118175 | 1/1989 | Japan | G03H 1/04 |
| 153359 | 3/1989 | Japan | G11B 7/135 |
| 155745 | 3/1989 | Japan | G11B 7/09 |
| 155746 | 3/1989 | Japan | G11B 7/09 |
| 186332 | 3/1989 | Japan | G11B 7/09 |
| 186337 | 3/1989 | Japan | G11B 7/135 |
| 146143 | 6/1989 | Japan | G11B 7/135 |
| 1053056 | 11/1983 | U.S.S.R. | G02B 5/32 |

*Primary Examiner*—William L. Sikes
*Assistant Examiner*—David R. Parsons
*Attorney, Agent, or Firm*—Douglas R. Millett

[57] ABSTRACT

A hologram system comprises two volume holograms on two separate substrates which are cemented together with an optical cement. The two volume holograms are manufactured with identical Bragg planes. The two volume holograms are oriented with respect to one another such that the Bragg planes are optically aligned. The result is that the two volume holograms operate as a single thicker volume hologram wherein the Bragg angle sensitivity is greatly increased.

36 Claims, 9 Drawing Sheets

INCREASED BRAGG ANGLE SENSITIVITY HOLOGRAM SYSTEM AND METHOD

BACKGROUND OF THE INVENTION

1. Field of the Invention

The present invention relates generally to volume holograms and more specifically, to a volume hologram with increased Bragg angle sensitivity.

2. Description of the Prior Art

Holograms are recordings of light intensity patterns created by the interference of two beams of mutually coherent light (the two beams are usually obtained by splitting a single laser beam). There are two major categories of holograms: transmissive and reflective. These two categories are further divided into two physical types of holograms: surface relief holograms and volume holograms. Surface relief holograms can be recorded using photolithographic processes. The interference pattern is recorded as a periodic variation in thickness of the material while the refractive index of the material remains fixed.

In a volume hologram, the interference pattern is recorded as a periodic variation in the refractive index of the material while the thickness of the material remains fixed. The periodic variation in refractive index creates surfaces of peak refractive index within the material. These surfaces are referred to as "Bragg surfaces." When the interference pattern is created by two plane waves or two waves with identical curvature at the hologram surface, the Bragg surfaces will be Bragg planes.

When the hologram is re-illuminated by one of the original beams at an angle that results in maximum diffraction efficiency, the internal angle of the beam relative to the Bragg planes is referred to as the "Bragg angle." The external angle of incidence at which maximum diffraction efficiency occurs is also often referred to as the Bragg angle.

Recently, holograms have been used for optical data storage applications. These holograms allow beams of light to be separated for various purposes. These hologram systems include the following references: JP 1-13246, published Jan. 18, 1989; JP 1-55745, published Mar. 2, 1989; JP 1-55746, published Mar. 2, 1989; JP 1-86337, published Mar. 31, 1989; JP 1-86332, published Mar. 31, 1989; JP 1-146143, published Jun. 8, 1989; JP 1-53359, published Mar. 1, 1989; JP 63-25845, published Feb. 3, 1988; JP 62-219340, published Sep. 26, 1987; JP 61-123032, published Jun. 10, 1986; JP 1-18175, published Jan. 20, 1989; JP 61-42613, published Mar. 1, 1986; SU 1053056, published Nov. 7, 1983; EP 350,014, published Oct. 1, 1990; U.S. Pat. No. 5,013,107, published May 7, 1991; and U.S. Pat. No. 4,497,534, published Feb. 5, 1985.

A problem with surface relief holograms is that they are not able to achieve efficient polarization separation except for a limited range of diffraction angles. Polarization separation is vex), important in magneto-optic systems where the data is sensed as changes in the plane of polarization of light reflected from the optical media. The ability of a hologram to have different diffraction efficiencies for beams incident at different angles is essentially controlled by the thickness of the diffracting structure. As a result, tile inherently thin surface relief holograms have a limited ability to separate beams propagating at small angles with respect to each other.

Volume holograms can be used to do polarization separation over a much wider range of diffraction angles. Volume holograms do not have the limitation problems of surface holograms since the whole volume, not just the surface, acts as the diffracting structure. However, volume holograms are limited ill thickness to approximately 25 microns or less. During processing, the processing chemicals have difficulty penetrating effectively beyond this depth. Thus, even if the holographic material is thicker than 25 microns, the effective hologram depth is limited to about 25 microns. The Bragg angle sensitivity of tile hologram increases as a function of the thickness of tile volume hologram. This means that a thick volume hologram is able to separate two beams having a very small angle of separation or divergence between their directions of propagation as compared to the ability of a thinner volume hologram. This ability to separate two beams having a very small angle of separation is especially important in multiple beam optical data storage systems. What is needed is a volume hologram of increased thickness and Bragg angle sensitivity.

SUMMARY OF THE INVENTION

Briefly, in a preferred, embodiment, the present invention comprises two volume holograms on two separate substrates which are then cemented together with a thin optical adhesive. The two holograms are identical to one another. The holograms are placed together with the optical adhesive located between them. The optical adhesive is radiation activated. The holograms are then rotationally and translationally moved relative to one another until their Bragg planes are optically aligned such that the diffracted beams from both holograms are in phase. The cement is then activated and the holograms are permanently bonded together. Ordinarily, two holograms cemented together will behave as two separate holograms. However, in the present invention the two holograms are identical and the alignment of their Bragg planes results in a combination of the two holograms which behaves as a single thick volume hologram. From the perspective of a light beam, the hologram system of the present invention behaves as a single volume hologram having thickness much greater than achieved in the prior an and providing the resulting increased Bragg angle sensitivity.

For a fuller understanding of the nature and advantages of the present invention, reference should be made to the following detailed description taken in conjunction with the accompanying drawings.

BRIEF DESCRIPTION OF THE PREFERRED EMBODIMENTS

Figure 1:
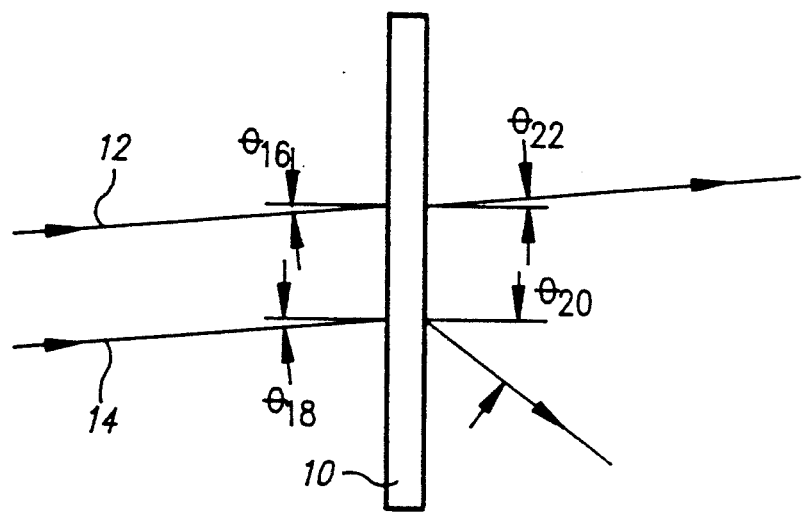
FIG. 1 is a schematic diagram of a hologram system of the present invention.

FIG. 1 is a schematic diagram of a hologram system of the present invention and is designated by the general reference number 10. System 10 receives a pair of laser beams 12 and 14. Beams 12 and 14 diverge from one another (propagate in slightly different directions) by a small angle (less than 2 degrees in the preferred embodiment). Beams 12 and 14 enter system 10 at angles of $\theta_{16}$ and $\theta_{18}$, respectively. Angle $\theta_{18}$ is equal to the Bragg angle of the hologram system 10, and so beam 14 is diffracted at an angle $\theta_{20}$ upon leaving system 10. However, angle $\theta_{12}$ deviates slightly from the Bragg angle and so beam 12 is not diffracted by system 10 and will exit system 10 at an angle $\theta_{22}$ which is equal to angle $\theta_{16}$. System 10 is very useful in separating two closely spaced or overlapping beams which have a slight angular deviation from one another.

Figure 2:
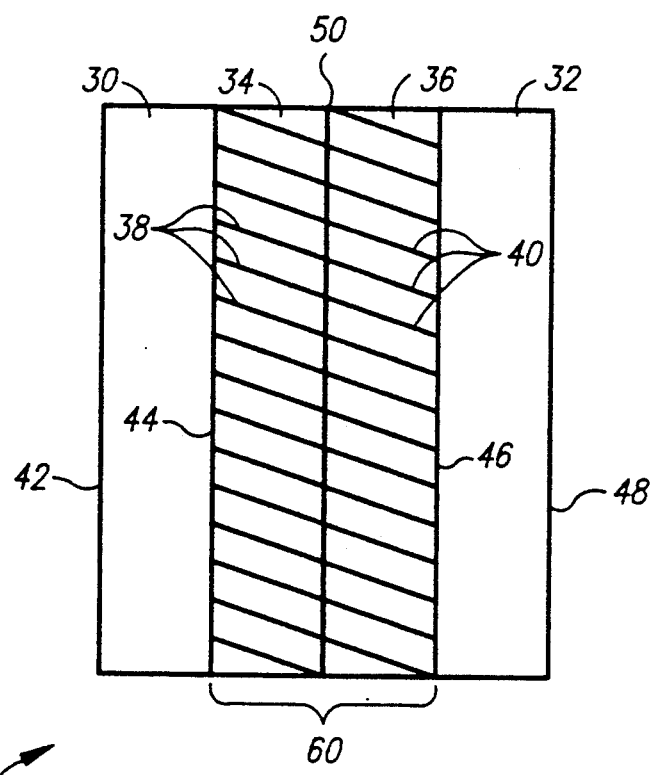
FIG. 2 is a cross sectional view of a hologram of the present invention.

FIG. 2 is a cross sectional view of system 10. System 10 has a pair of substrates 30 and 32. Substrates 30 and 32 may be made of a suitable optically transparent material such as glass. A volume hologram 34 is formed on substrate 30 and a volume hologram 36 is formed on substrate 32. Holograms 34 and 36 may be made of a holographic material such as dichromated gelatin. Holograms 34 and 36 each contain a plurality of Bragg planes 38 and 40, respectively, which are typical of volume holograms. As will be explained in more detail below, the holograms 34 and 36 are made such that their respective Bragg planes are oriented at the same angle and have the same spacing. The holograms 34 and 36 are cemented together with an optical cement 50. Substrate 30 has an outer surface 42 and an inner surface 44. Substrate 32 has an inner surface 46 and an outer surface 48. The hologram 34 is then glued to hologram 36 using the optical cement 50. Note that the Bragg planes 38 of hologram 34 are aligned in parallel with the Bragg planes 40 of hologram 36. In other words, each of the Bragg planes 38 are optically aligned with the corresponding Bragg planes 40, such that light beams diffracted from both sets of Bragg planes are in phase. Ideally, each of the Bragg planes 38 lie in the same plane as a corresponding Bragg plane 40. However, there may be some phase shift of light due to the optical cement 50 between the holograms 34 and 36. This phase shift may necessitate that the Bragg planes 38, although parallel to the Bragg planes 40, do not lie in exactly the same plane This slight offset to compensate for the phase shift is taken into account during the alignment of the holograms in the manufacturing process described below. The resulting structure is such that holograms 34 and 36 behave as a single volume hologram 60.

Figure 3:
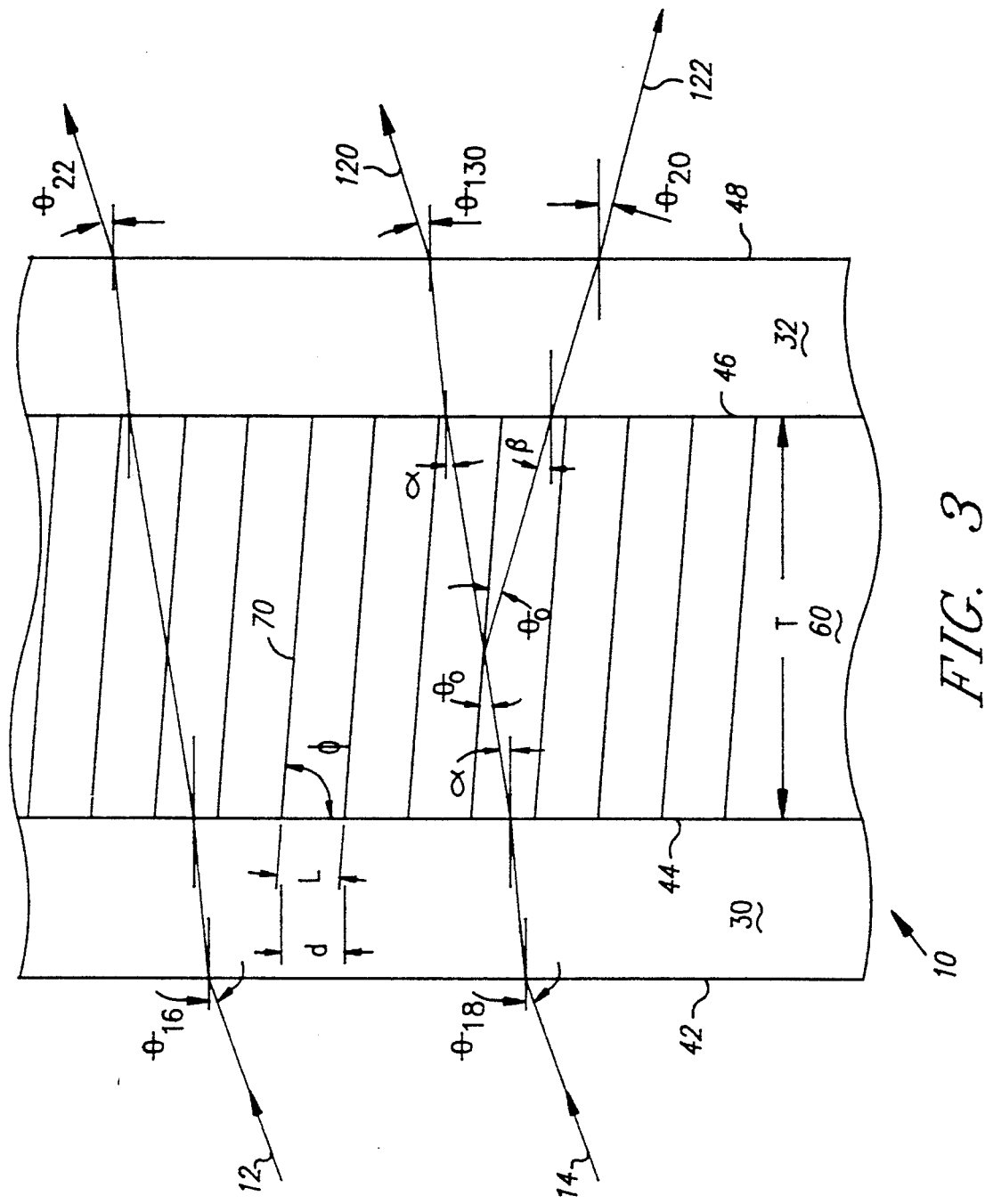
FIG. 3 is a cross sectional view of a single volume hologram which illustrates the optical behavior of the present invention.

FIG. 3 is a detailed cross sectional view of system 10. For purposes of this discussion, holograms 34 and 36 are treated as a single volume hologram 60 which has Bragg planes 70. Hologram 60 comprises a hologram material, such as dichromated gelatin, having a thickness T located between substrates 30 and 32. The Bragg planes 70, which are really the separate aligned Bragg planes 38 and ,40, have a separation distance L, an external fringe spacing distance d, and an angle $\Phi$ relative to surface 74.

In operation, beam 14 enters substrate 30 at an angle $\theta_{18}$. This angle $\theta_{18}$ is also referred to as the angle of incidence $\theta_I$. Beam 14 experiences refraction at the outer surface 42 of substrate 30, and at surface 44 between substrate 30 and hologram 60, before entering hologram 60 at an angle $\alpha$. From Snell's Law, $$\alpha = a \sin (\sin \theta_I / n_0)$$

where $n_0$ is the average index of refraction of the material of hologram 60.

A portion of beam 14 travels through hologram 60 without experiencing any diffraction and exits substrate 32 as a beam 120. Beam 120 experiences refraction at surfaces 46 and 48. Beam 120 exits surface 48 at an angle $\theta_{130}$ which is equal to $\theta_{18}$. Beam 120 will appear to be transmitted through hologram 60 without diffraction. As will be explained in more detail below, in the preferred embodiment, hologram 60 is designed such that beam 120 does not exist and 100% of beam 14 is diffracted as beam 122.

A portion of beam 14 is diffracted by the Bragg plane 70. The angle of beam 14 relative to Bragg plane 70 is $\theta_0$ and is equal to a sin $[\lambda_1/2n_0L]$, where $\lambda_1$ is the wavelength of the beam 14 in air. The diffracted beam encounters surface 46 at an internal diffraction angle $\beta$. The diffracted beam exits substrate 32 at surface 48 as beam 122. Beam 122 exits surface 48 at a diffracted output angle of $\theta_{20}$ where $\theta_{20} = a \sin (n_0 \sin \beta)$. The exact properties of beam 120 and 122 are described in more detail below.

In designing the hologram 60, the following variables are taken into account:

$\theta_I$ = angle of incidence (external). For beam 14 the angle $\theta_{18} = \theta_I$.

$\alpha$ = angle of incidence (internal).

$\beta$ = angle of diffraction (internal).

$\delta$ = deviation from the Bragg angle. Assumed to be equal to zero for beam 14.

$\Phi$ = tilt of Bragg planes. For no tilt $\Phi = \pi/2$ radians (90°).

L = separation of the Bragg planes.

T = thickness of hologram material.

d = external fringe spacing.

$n_0$ = average refractive index of the hologram medium, typically 1.26 for an exposed and processed dichromated gelatin holographic grating with high $n_1$.

$n_1$ = Peak change in index of refraction of the hologram medium. Typically 0.1 for dichromated gelatin.

$\lambda_a$ = wavelength of light in air. Here $\lambda_a = \lambda_1 = 780$ nm.

$\delta\lambda$ = deviation from $\lambda_a$ (Bragg $\lambda$). Assumed to be equal to zero.

These variables are used in the following formulas:

$$\alpha = \sin\left[\frac{a\sin[\theta_1]}{n_0}\right] \quad (1)$$

$$\beta = a\sin\left[\frac{\sin(\theta_{20})}{n_0}\right] \quad (2)$$

$$\phi = \frac{\pi}{2} - \frac{\beta - \alpha}{2} \quad (3)$$

$$\theta_0 = \alpha + \frac{\pi}{2} - \phi \quad (4)$$

$$L = \frac{\lambda_a}{2n_0\sin[\theta_0]} \quad (5)$$

$$d = \frac{L}{\sin(\phi)} \quad (6)$$

$$C_R = \cos(\alpha) \quad (7)$$

$$C_S = \cos(\alpha) - \frac{\lambda_a}{n_0 L}\cos(\phi) \quad (8)$$

$$N = \pi n_1 \frac{T}{\lambda_a \sqrt{C_R C_S}} \quad (9)$$

$$\Gamma = 2\pi\delta\frac{\sin[\phi - \theta_0]}{L} - \delta_\lambda \frac{\pi}{n_0 L^2} \quad (10)$$

$$S = \Gamma \cdot \frac{T}{2C_S} \quad (11)$$

$$E_S = \frac{[\sin[\sqrt{N^2 + S^2}]]^2}{1 + \frac{S^2}{N^2}} \quad (12)$$

$$E_P = \frac{[\sin[\sqrt{[N\cos[2\theta_0]]^2 + S^2}]]^2}{1 + \frac{S^2}{[N\cos[2\theta_0]]^2}} \quad (13)$$

Formulas (12) and (13) above give the diffraction efficiencies for the S and P orthogonal polarization components and determine the conditions of the beams 120 and 122. Es is the diffraction efficiency of the S polarized light component and Ep is the diffraction efficiency of the P polarized light component. The S and P represent the orthogonal polarization components of the light. A more detailed discussion of hologram mathematics is given by Herwig Kogelnik in "Coupled Wave Theory for Thick Hologram Gratings," Bell System Technical Journal, Vol. 48, No. 9, p. 2909 (November 1969).

Beam 12 enters system 10 at an angle $\theta_{16}$ and exits at an angle $\theta_{22}$. The angle $\theta_{16}$ is equal to the angle $\theta_{22}$ and beam 12 appears to pass through hologram 60 without diffraction. Beam 14 is diffracted because it enters hologram 60 at the hologram's Bragg angle. Beam 12 is not diffracted because it enters hologram 60 at an angle which is different from the Bragg angle.

The parameters of the desired hologram 60 are determined using the above formulas in conjunction with the desired angles $\theta_{18}$ and $\theta_{20}$ of the beam 12. In a preferred embodiment which diffracts both the S and P polarization components of beam 14, hologram 60 is designed with $\theta_{18}$ equal to 20°, $\theta_{20}$ equal to 20°, $\Phi$ equal to 90°, $n_1$320.0081, L equal to 1.14 µm, and T = 50 micrometers.

Figure 4:
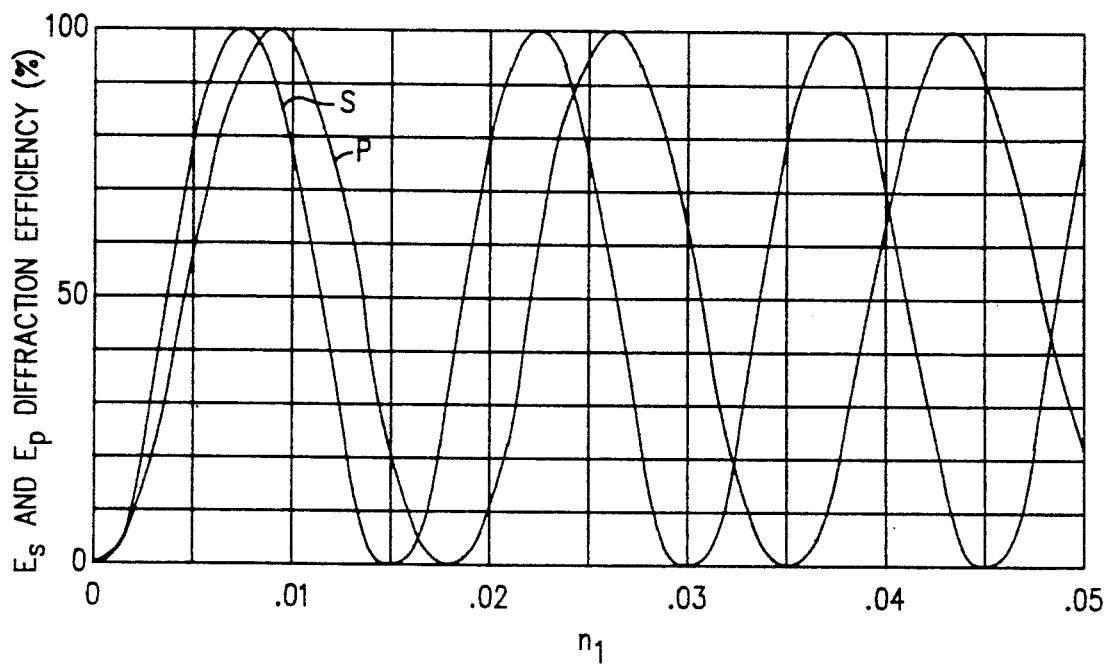
FIG. 4 is a graph of diffraction efficiency versus peak index of refraction for a volume hologram.

FIG. 4 is a graph of S and P diffraction efficiency versus the peak change index of refraction ($n_1$) for beam 14 in the preferred embodiment. This graph is generated using the formulas (12) and (13) above. The value for $n_1$ is determined based upon the desired diffraction efficiency. The diffraction efficiency is a measure of how much of each polarization component of beam 14 is diffracted as beam 122 or remains undiffracted as beam 120. For example, if $n_1$ is approximately 0.0351, then 0% of the P component of beam 14 is diffracted and approximately 76% of the S component is diffracted.

In the preferred embodiment, it is desired that as much of beam 14 be diffracted as possible. The value of $n_1$ is therefore chosen such that both the S component and the P component approach approximately 100% diffraction. In the preferred embodiment $n_1$ is selected to be 0.0081. This gives a diffraction efficiency for S and P components both of approximately 98.5%.

Figure 5:
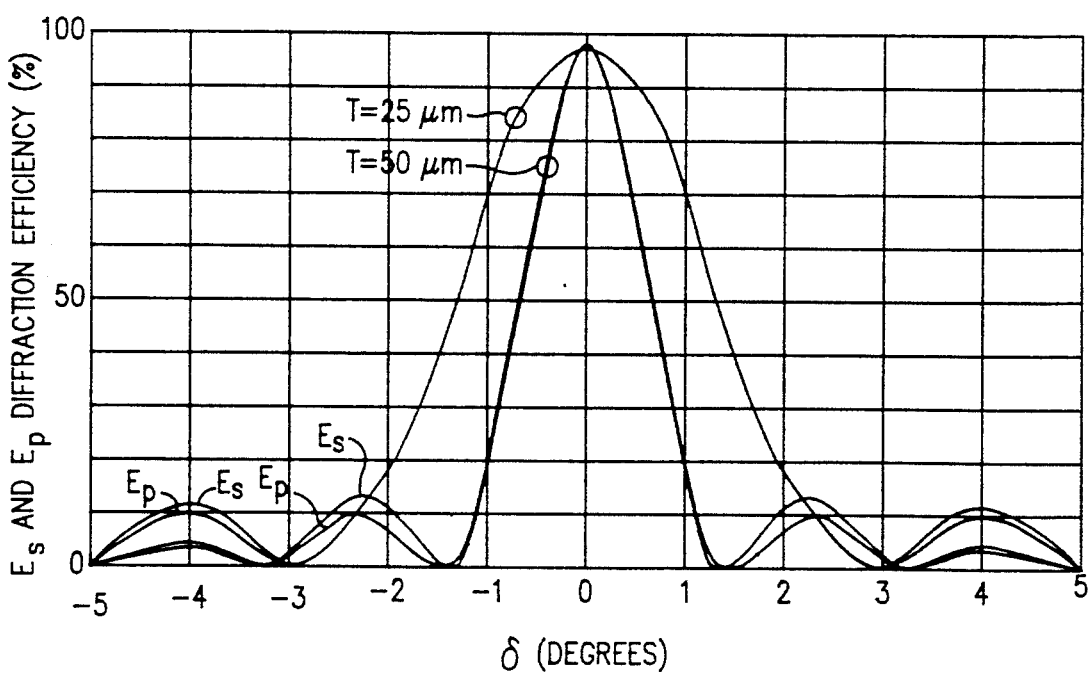
FIG. 5 is a graph of diffraction efficiency versus angular deviation from the Bragg angle of a volume hologram.

FIG. 5 shows a graph of the S and P polarization efficiency for the hologram of FIG. 4 versus the angle δ, where δ is the angle of deviation from the hologram's Bragg angle. The graph shows the hologram 60 having thicknesses T = 50 microns and a graph of a similar hologram having a thickness of T = 25 microns and $n_1$ = 0.0162 for comparison.

The thicker the hologram the better its ability to selectively diffract angularly separated beams. Discrimination is the ability to selectively diffract angularly separated beams. For example, if hologram 60 is 50 microns thick, then beam 14 will enter hologram 60 at the Bragg angle (δ=0) and will be diffracted with approximately 100% diffraction efficiency. Beam 12 can enter hologram 60 at a 1.5 degree deviation from beam 14 (δ=1.5°) and will not be diffracted (0% diffraction efficiency). The two beams 12 and 14 will then be separated by selected diffraction when they are only 1.5 degrees apart from each other. However, if the hologram 60 is only 25 microns thick, then beam 12 will have to deviate at least 3 degrees (δ=3°) from beam 14 (where beam 14 is incident at the Bragg angle) for there to be complete separation (0% of beam 12 is diffracted). As explained above, the prior art volume holograms were limited to thicknesses of T = 25 microns. The present invention teaches a way to make thicker holograms and achieve the resulting advantage in beam separation.

In many optical systems only one type of polarized light component (S or P) is used. In such a case, the desired hologram need only be designed to diffract the desired S or P polarization component, and the undesired polarization component may be ignored. For example, hologram 60 may be designed to diffract only the P polarization component. In a preferred embodiment of such a hologram, $\theta_{18}$ = 31°, $\theta_{20}$ = 31°, $\Phi$ = 90°, $n_1$ = 0.011, L = 0.757 µm, and T = 50 micrometers.

Figure 6:
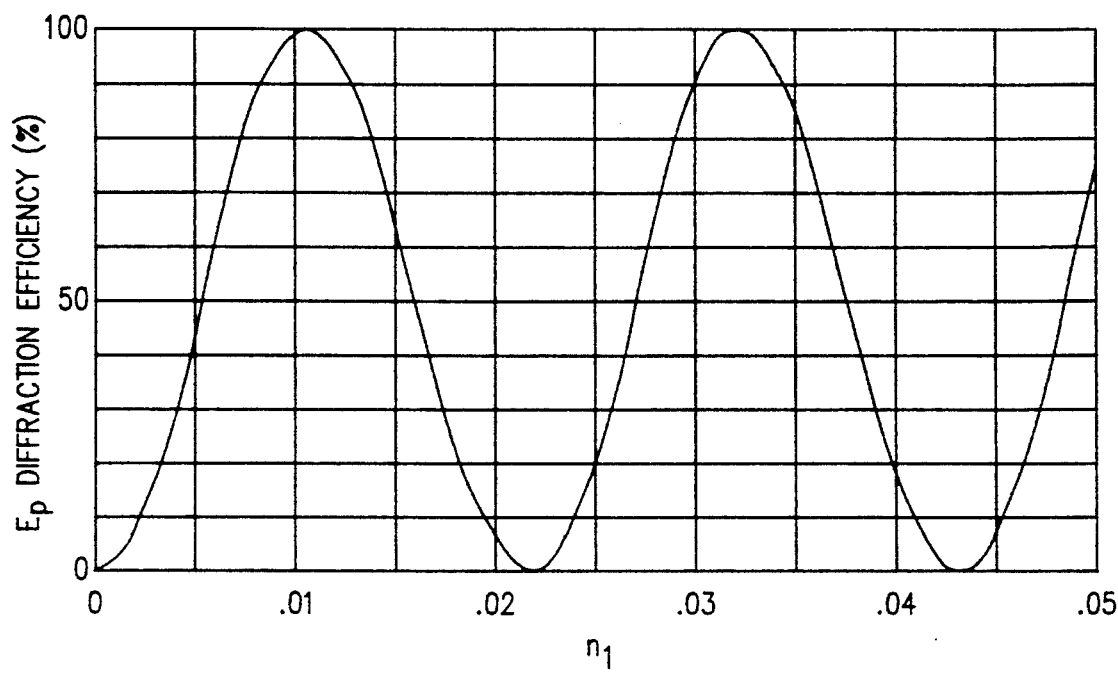
FIG. 6 is a graph of diffraction efficiency versus peak index of refraction for a volume hologram.

FIG. 6 shows a graph of P polarization diffraction efficiency versus $n_1$ for such a P polarization diffracting hologram 60. This graph shows only the efficiency of the P polarization component because the S polarization component is ignored. To achieve 100% diffraction efficiency of the P component $n_1$ is chosen to be 0.011.

Figure 7:
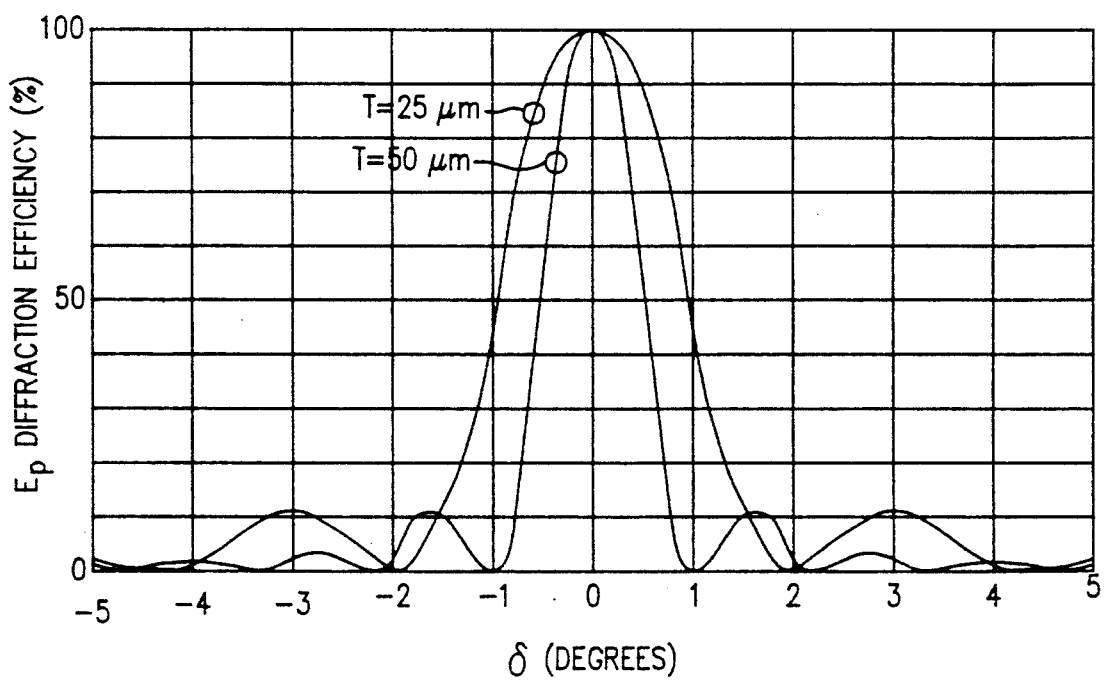
FIG. 7 is a graph of diffraction efficiency versus angular deviation from the Bragg angle of a volume hologram.

FIG. 7 shows a graph of P polarization diffraction efficiency versus δ (deviation from the Bragg angle). Note that for the T=25 micrometers and $n_1$=0.022 hologram of the prior art, the deviation of the nondiffracted beam 12 from the diffracted beam 14 must be at least 2 degrees in order to achieve 100% separation. In the present invention, T can be greater than 25 micrometers and the deviation angle can be less than 2 degrees and as small as 1 degree in the case where T=50 micrometers.

Figure 8:
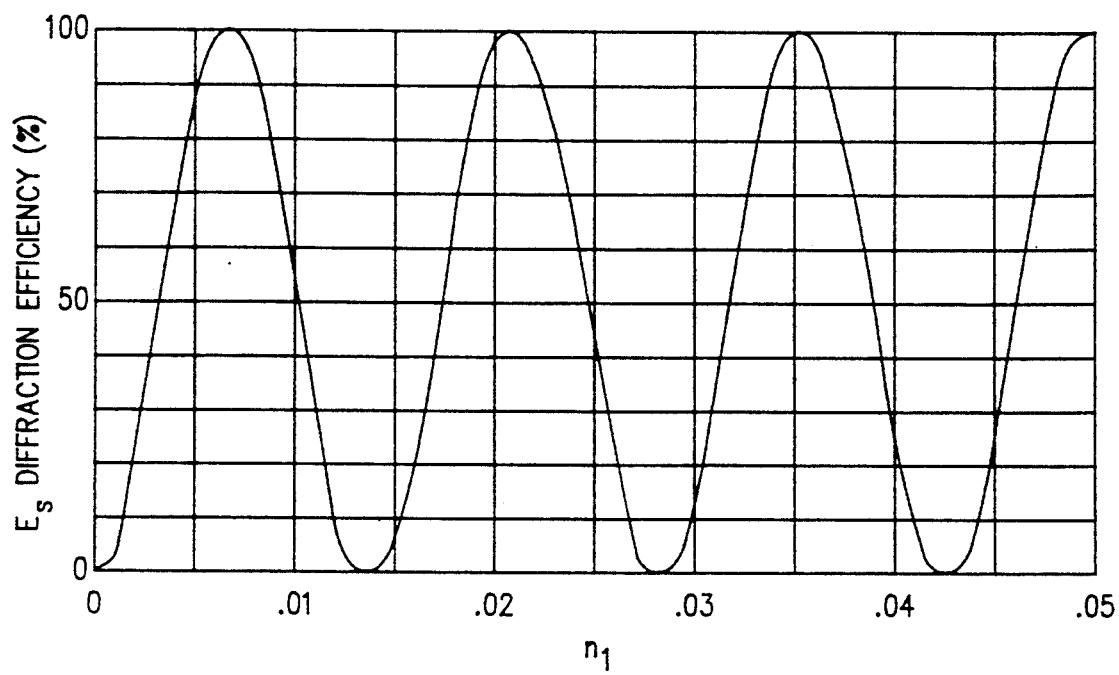
FIG. 8 is a graph of diffraction efficiency versus peak index of retraction for a volume hologram.
Figure 9:
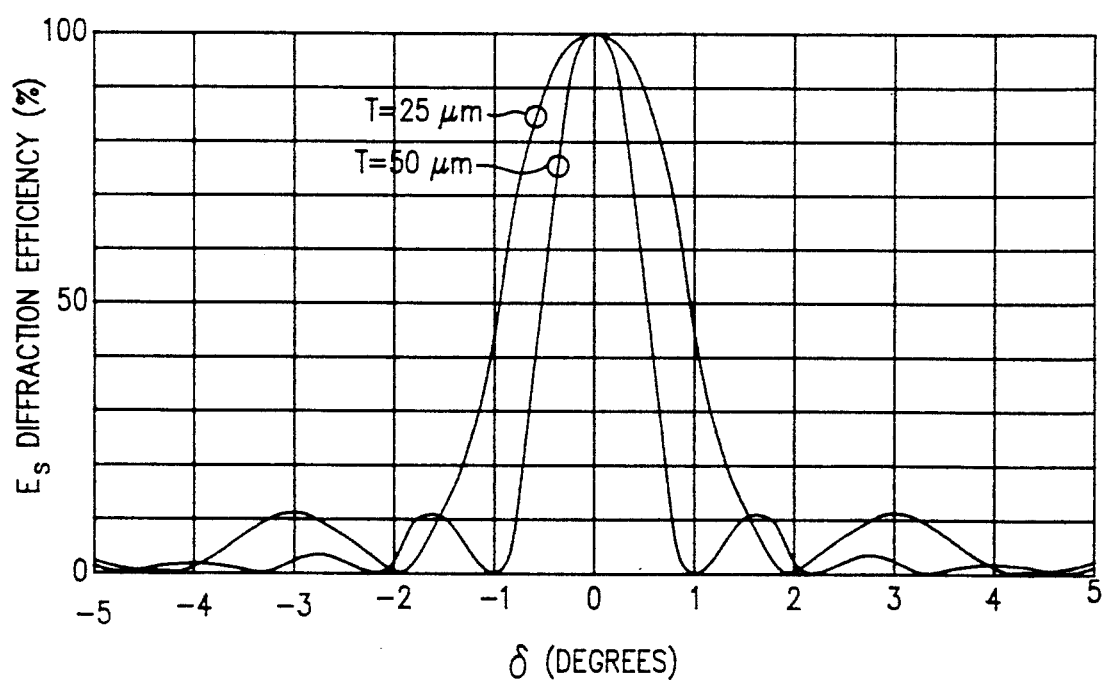
FIG. 9 is a graph of diffraction efficiency versus angular deviation from the Bragg angle of a volume hologram.

The hologram 60 may also be made to diffract only S polarization light and the P polarization component is ignored. In a preferred embodiment, such a hologram 60 has $\theta_{18}$=32°, $\theta_{20}$=32°, Φ=90°, $n_1$=0.007, L=0.736 μm, and T=50 micrometers. FIGS. 8 and 9 show the S polarization diffraction efficiency versus $n_1$ and δ, respectively, for such a hologram. As before, the present invention is able to separate two beams having angles of deviation of less than 2 degrees and as low as 1 degree.

Figure 10:
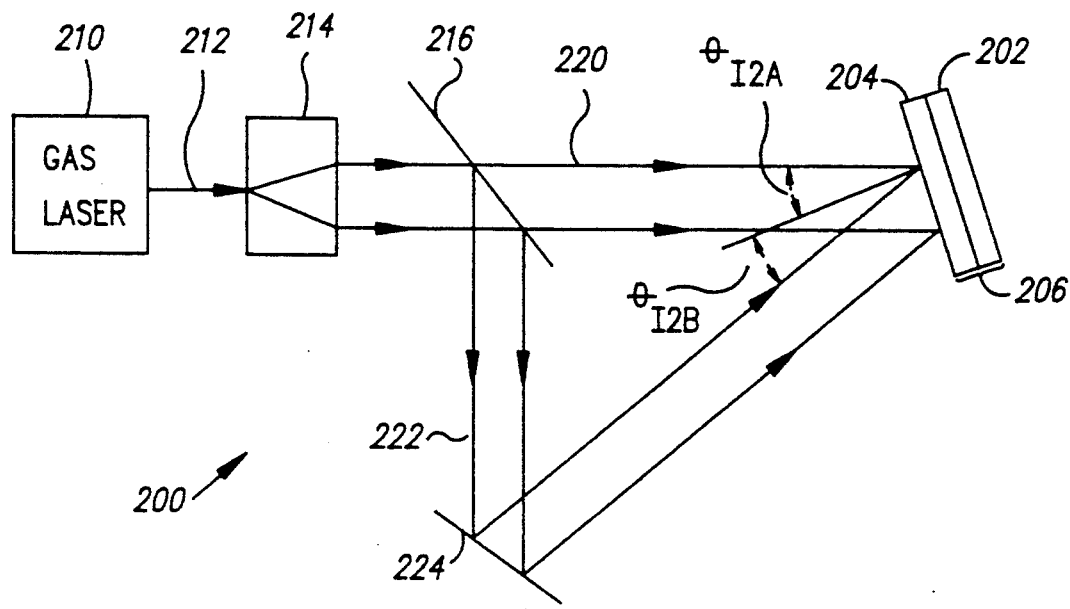
FIG. 10 is a schematic diagram of a system for making the hologram system of the present invention.

FIG. 10 shows a schematic diagram of a system for manufacturing the hologram system 10 and is designated by the general reference number 200. From the previous steps, all of the variables of the desired hologram 60 have been determined. These include Φ, L, T and $n_1$. A glass substrate 202 is coated with a holographic material 204 to a depth equal to T/2, where T is the desired thickness of the complete hologram 60. The combined substrate 202 and material 204 are referred to as a plate 206. In a preferred embodiment, dichromated gelatin is used as material 204.

In order to record the hologram it is necessary to use a light wavelength which will react with the hologram material. The recording wavelength $\lambda_2$ should be approximately 488 nm for dichromated gelatin. System 200 uses a gas laser 210 which emits a light beam 212 at the recording wavelength $\lambda_2$. Beam 212 is expanded by a beam expander 214. A beamsplitter 216 splits beam 212 into an object beam 220 and an image beam 222. Beam 222 is reflected by a mirror 224 to plate 206. Beams 220 and 222 intersect at the hologram at recording external incident angles of $\theta_{l2A}$ and $\theta_{l2B}$, respectively. The angles $\theta_{l2A}$ and $\theta_{l2B}$ are determined by the conditions of the desired hologram as was described above. The recording internal angles of incidence are $\alpha_{2A}=\Phi-\pi/2-a\sin[\lambda_2/2n_0L]$ and $\alpha_{2B}=\Phi-\pi/2+a\sin[\lambda_2/2n_0L]$. From Snell's Law, $\theta_{l2A}=a\sin(n_0\sin\alpha_{2A})$ and $\theta_{l2B}=a\sin(n_0\sin\alpha_{2B})$. It should be noted that in the equations in this paragraph, $n_0$ is the index of refraction of the unprocessed hologram material and is approximately 1.53 for unprocessed dichromated gelatin. The hologram material 204 is thereby exposed to light of $\lambda_2$ at angles $\theta_{l2A}$ and $\theta_{l2B}$. The result is that the desired Bragg planes are recorded in the film. The exact exposure and process times are determined by the desired value for $n_1$.

Figure 11:
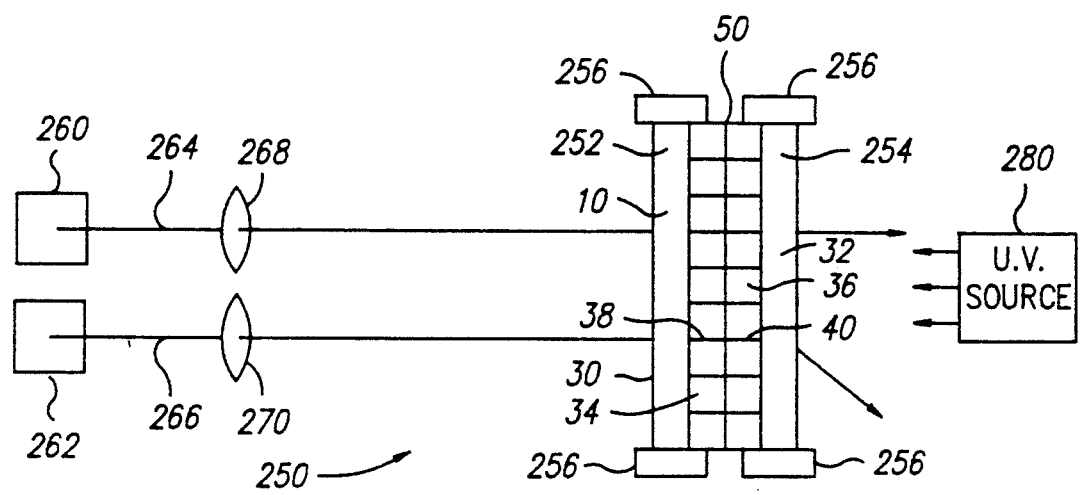
FIG. 11 is a schematic diagram of an additional system for making the hologram system of the present invention.

FIG. 11 shows a schematic diagram of a system for further manufacture of the hologram system 10 of the present invention and is designated by the general reference number 250. Once plate 206 has been exposed and processed, it is cut into two equal pieces, 252 and 254. Piece 252 corresponds to substrate 30 and hologram 34 and piece 254 corresponds to substrate 32 and hologram 36. The pieces 252 and 254 are positioned together with an optical cement 50 located between the respective holograms 34 and 36 which is curable by exposure to ultraviolet light. The resulting assembly (hologram system 10) is placed in the holders of an optical translational and rotational precision stage 256. The pieces 252 and 254 are rotationally moved relative to one another until the Bragg planes 38 of hologram 34 are parallel with the Bragg planes 40 of hologram 36.

A pair of lasers 260 and 262 at wavelength $\lambda_1$ are used to aid in the alignment process. Laser 260 generates a beam 264 and laser 262 generates a beam 266. The beams 264 and 266 are collimated by lenses 268 and 270, respectively. Beams 264 and 266 are oriented such that they strike system 10 at the same angles as beams 12 and 14, respectively. The pieces 252 and 254 are then moved translationally relative to one another until beam 266 is completely diffracted. At this position, Bragg planes 38 and 40 will be aligned in parallel and holograms 34 and 40 will function as a single hologram 60.

In the preferred embodiment, 100% of beam 266 is diffracted. However, it may be desired in some applications to create a hologram system in which only a portion of beam 266 is diffracted and the remaining portion passes through undiffracted. This may be achieved by rotationally moving pieces 252 and 254 until the Bragg planes are aligned, and then moving pieces 252 and 254 vertically relative to one another until the desired percentage of beam 266 is diffracted.

Once the pieces 252 and 254 are oriented correctly, an ultraviolet light source 280 is energized and floods the system 10 with ultraviolet light. This activates the cement 50 and pieces 252 and 254 are permanently bonded together. The system 10 is now complete.

It should be noted that many holograms of the exact same type may be manufactured easily and efficiently by combining two large plates 252 and 254, bonding them together after alignment, and then slicing the resulting structure up into many smaller holograms.

The present invention could be implemented in other ways. For example, instead of combining two holograms of the same thickness, two holograms of different thicknesses could be combined. In such a case, the two holograms of different thicknesses would be manufactured in separate processes and then combined. The only requirement is that the holograms be made with similar Bragg planes. In other words, the tilt angle Φ and the spacing L would be the same for both holograms.

As explained above, the hologram system 10 of the present invention is able to separate two overlapping beams having a slight angular deviation. This feature is very important in optical data storage systems.

Figure 12:
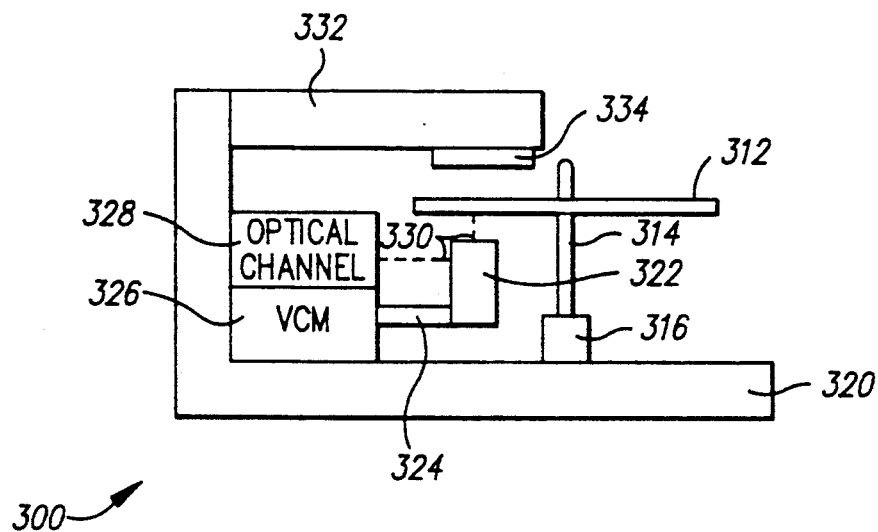
FIG. 12 is a schematic diagram of an optical data storage system of the present invention.

FIG. 12 shows a schematic diagram of a direct read after write (DRAW) optical data storage system of the present invention and is designated by the general reference number 300. A DRAW system comprises two lasers; one laser (the Read/Write laser) to write a track and a second laser (the DRAW laser) to read and verify the data directly after it has been written. DRAW systems use two lasers to record and verify in a single revolution of the optical disk what normally takes a single laser multiple revolutions of the disk to achieve. DRAW systems are illustrative of the problems encountered in multiple beam systems in optical data storage recording. In such multiple beam systems it is desirable that both beams use the same optical channel. This results in two overlapping beams having a slight angle of divergence from one another. Ordinarily it is very difficult to separate the two beams for purposes of data detection and servoing. However, the hologram system 10 of the present invention is easily able to separate these two beams.

The DRAW system 300 includes an optical data storage disk 312. Disk 312 is preferably a magneto-optic (MO) type of disk. Disk 312 is mounted on a spindle 314 which is attached to a spindle motor 316. Motor 316 is attached to a system chassis 320. Motor 316 rotates spindle 314 and disk 312.

An optical head 322 is positioned below disk 312. Head 322 is attached to an arm 324 which in turn is connected to a voice coil motor 326. Motor 326 is attached to chassis 320 and moves arm 324 and head 322 in a radial direction below disk 312. A dashed line 330 shows the path of light from an optical channel 328 to head 322, to disk 312 and back. A magnet arm 332 is connected to chassis 320 and extends over disk 312. A bias magnet 334 is mounted to arm 332.

Figure 13:
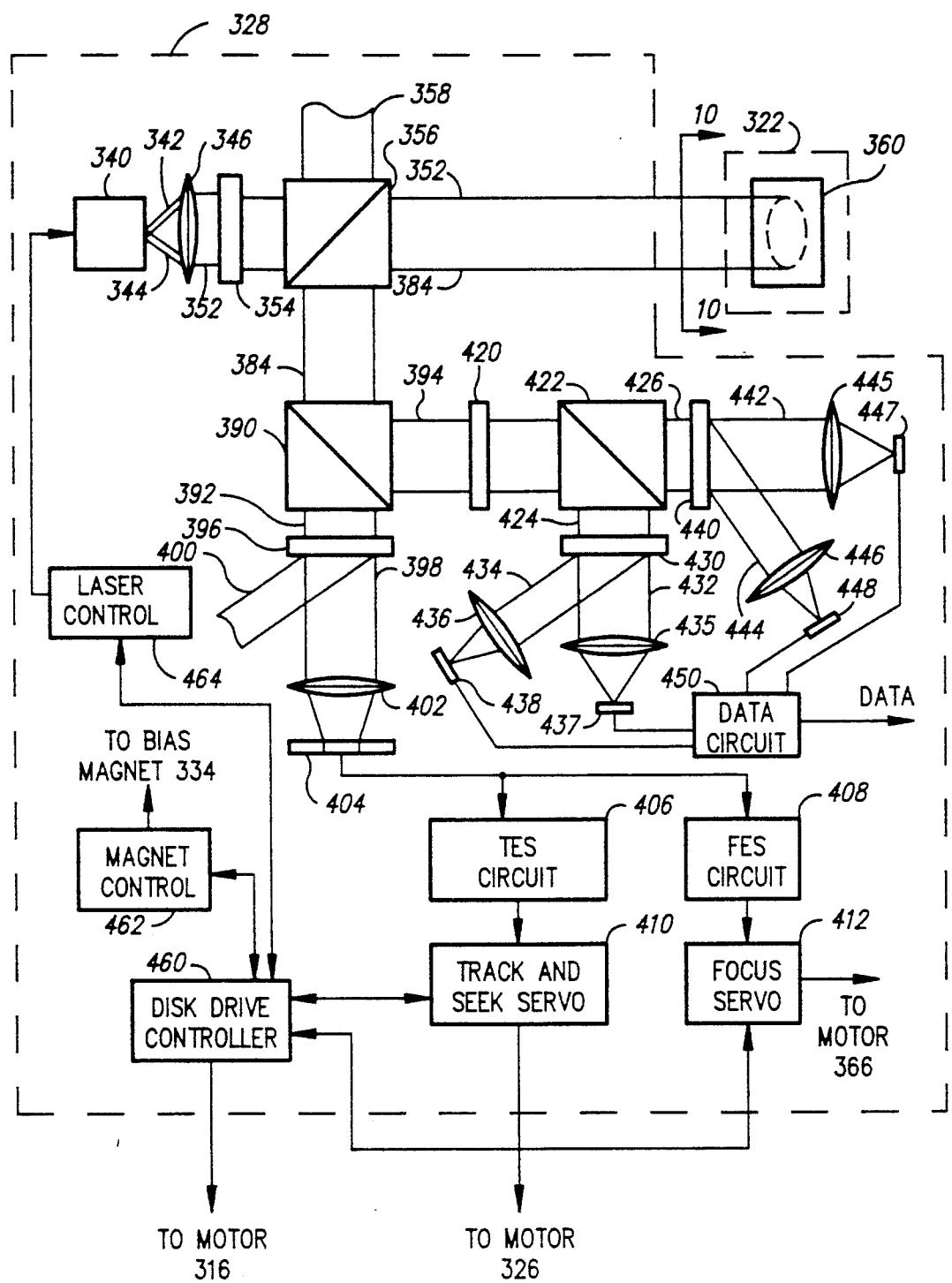
FIG. 13 is a schematic diagram of a portion of the system of FIG. 12.

FIG. 13 shows a schematic diagram of optical channel 328 of FIG. 12. A laser array 340 produces an S polarized Read/Write (R/W) beam 342 and an S polarized direct read after write (DRAW) beam 344. Beams 342 and 344 are collimated by a lens 346. Due to their separate points of origin, beams 342 and 344 diverge from each other by approximately one degree after passing through lens 346. The overlapping beams 342 and 344 will be referred to collectively as transmission beam 352. Beam 352 is circularized by a circularizing prism 354. Beam 352 passes to a beamsplitter 356. A portion of beam 352 is directed away from beamsplitter 356 as beam 358 and is unused in this embodiment. The remaining portion of beam 352 passes to the optical head 322. Head 322 has a beam bender mirror 360 oriented at a 45° angle such that beam 352 is directed upward and out of the surface of the page of FIG. 13.

Figure 14:
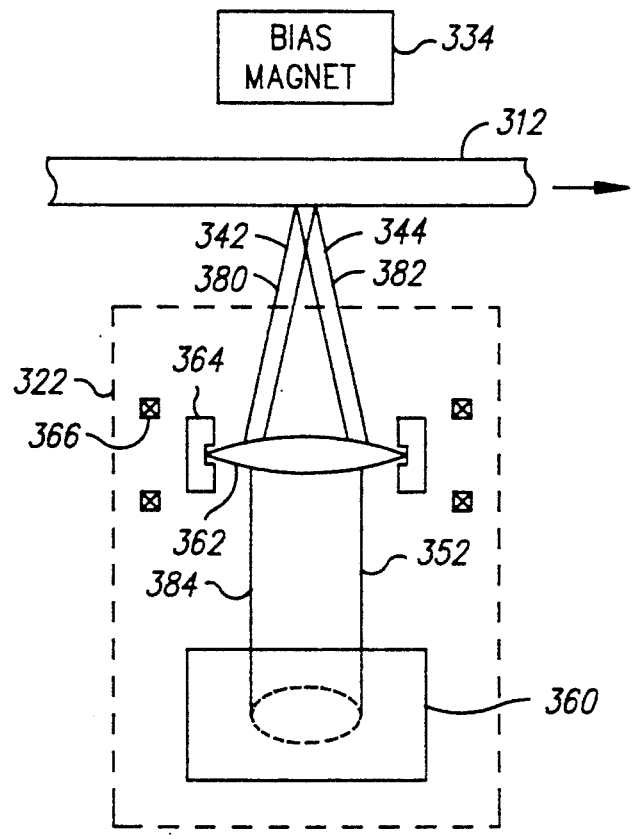
FIG. 14 is a schematic diagram of a portion of the system of FIG. 12.

FIG. 14 shows a side view of the optical head 322 from the perspective shown by the arrows of FIG. 13. The beam 352 is directed upwards from mirror 360 to a lens 362. Lens 362 is located in a holder 364 which is attached to a voice coil motor 366. Motor 366 moves lens 362 vertically up or down in order to focus the light onto the disk 312. At lens 362, the light beam 352 is divided back into the R/W beam 342 and the DRAW beam 344. The beams are separated by lens 362 because of the diverging angle with respect to one another.

The beams 342 and 344 are focussed to the same track of disk 312. As disk 312 rotates in the direction of the arrow, the track is written by beam 342 and then immediately verified by beam 344. Beams 342 and 344 are reflected by disk 312 as a reflected R/W beam 380 and a reflected DRAW beam 382. The overlapping beams 380 and 382 will be referred to as reflected beam 384. The reflected beam 384 is collimated by lens 362 and is reflected by mirror 360.

See FIG. 13. Beam 384 passes through beamsplitter 356. At beamsplitter 356 a portion of beam 384 is reflected toward a beamsplitter 390. Beamsplitter 390 divides beam 384 into a servo beam 392 and a data beam 394. Servo beam 392 passes to a hologram 396 which divides beam 392 into a R/W component beam 398 and a DRAW component beam 400. Beam 400 is not needed for servoing and is unused. Hologram system 10 may be used for hologram 396. Beam 398 passes to a focussing lens 402 and a servo optical detector 404. Detector 404 may be a segmented spot size measuring detector as is known in the art. A tracking error circuit 406 and a focus error circuit 408 are connected to detector 404. Circuit 406 generates a tracking error signal which is used by a track and seek servo 410 to control motor 326 to keep the beams on track. Circuit 408 generates a focus error signal which is used by a focussing servo 412 to control motor 366 to move lens 362 in order to keep the beams focussed on the disk 312.

Data beam 394 passes through a half waveplate 420 to a polarizing beamsplitter 422. Beamsplitter 422 divides beam 394 into orthogonally polarized beams 424 and 426. A hologram 430 divides beam 424 into a R/W component beam 432 and a DRAW component beam 434. Beams 432 and 434 are focussed by lenses 435 and 436, respectively, and fall upon a pair of optical detectors 437 and 438, respectively. A hologram 440 divides beam 426 into a R/W component beam 442 and a DRAW beam 444. Beams 442 and 444 are focussed by lenses 445 and 446, respectively, and fall upon a pair of optical detectors 447 and 448, respectively. Detectors 437, 438, 447 and 448 are connected to a data circuit 450. Hologram system 10 may be used for holograms 430 and 440.

A disk controller 460, as is known in the art, provides overall system control. Controller 460 is connected to magnet control 462, a laser control 464, motor 316 and servos 410 and 412 which are known in the art.

Figure 15:
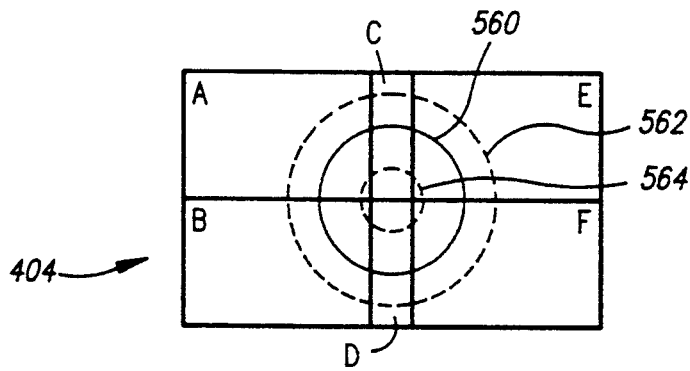
FIG. 15 is a schematic diagram of an optical detector of FIG. 13.

FIG. 15 shows a top view of detector 404. Detector 404 is divided into six sections, 404A, B, C, D, E and F.

Figure 16:
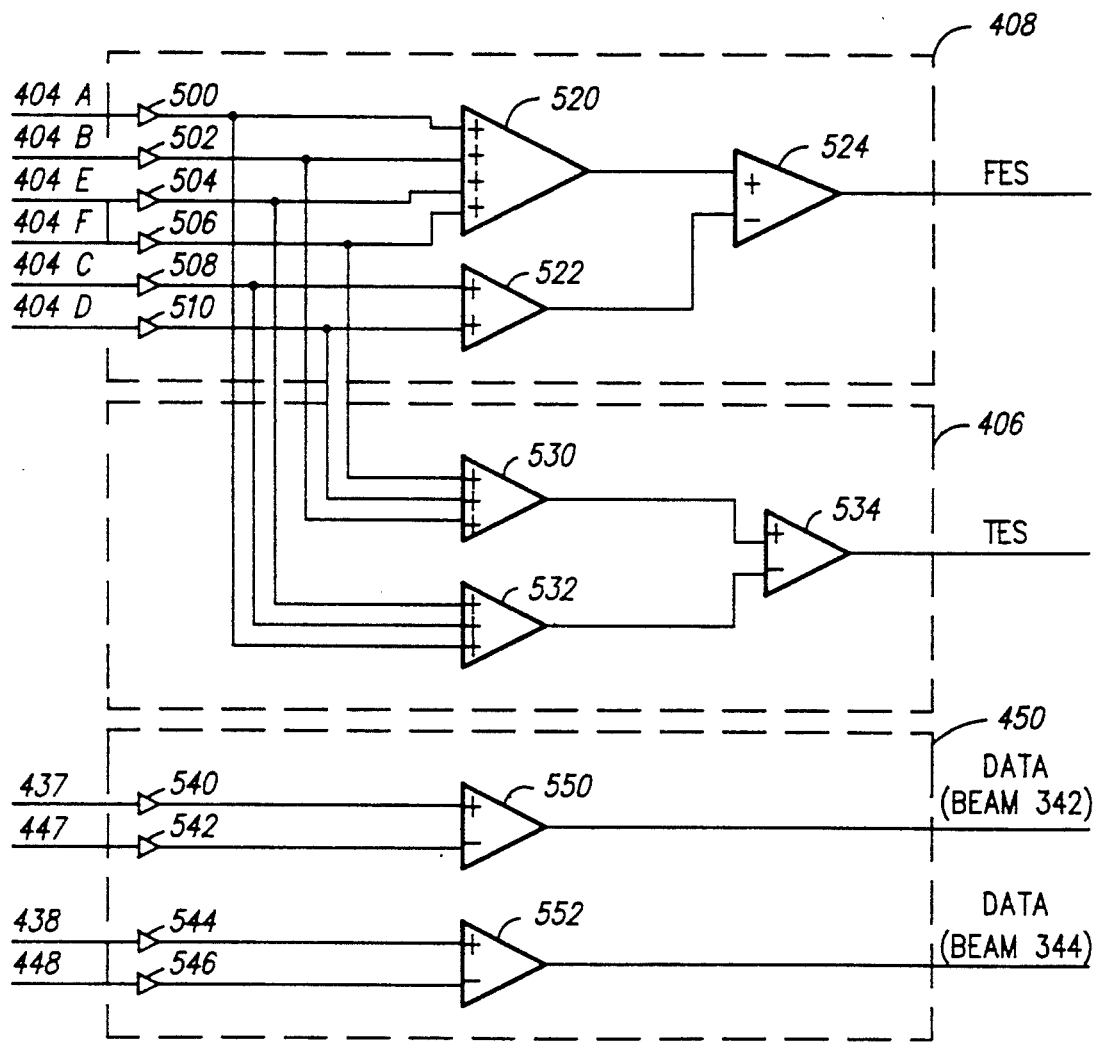
FIG. 16 is a circuit diagram of a portion of the system of FIG. 13.

FIG. 16 shows a circuit diagram of the TES circuit 406, the FES circuit 408 and the data circuit 450. FES circuit 408 comprises a plurality of amplifiers 500, 502, 504, 506, 508 and 510 connected to detectors section 404A, B, E, F, C and D, respectively. A summing amplifier 520 is connected to amplifiers 500-506 and a summing amplifier 522 is connected to amplifiers 508 and 510. A differential amplifier 524 is connected to summing amplifiers 520 and 522 and generates the FES.

TES circuit 406 comprises a pair of summing amplifiers 530 and 532, and a differential amplifier 534. Amplifier 530 is connected to amplifiers 502, 506 and 510, and amplifier 532 is connected to amplifiers 500, 504 and 508. Differential amplifier 534 is connected to amplifiers 530 and 532 and generates a TES.

Data circuit 450 has a plurality of amplifiers 540, 542, 544 and 546 connected to detectors 437, 447, 438 and 448, respectively. A differential amplifier 550 is connected to amplifiers 540 and 542 and generates a data signal representative of the data detected by beam 342. A differential amplifier 552 is connected to amplifiers 544 and 546, and generates a data signal representative of the data detected by beam 344.

The operation of system 300 may now be understood. When it is desired to write data on disk 312, controller 460 causes laser control 464 to energize laser array 340 such that both beams 342 and 344 are produced. Beams 342 and 344 are then directed to the disk 312 as explained above. Beam 342 is of sufficient power to heat the magneto-optical material of disk 312 to a temperature above its Curie temperature. At this temperature the magnetic domains of the material may be oriented in an opposite direction by bias magnet 334. Typically, the domains of media 312 are oriented in an original direction and bias magnet 334 is used to reverse the domains of those spots which beam 342 heats above the Curie temperature. Controller 460 causes laser control 464 to pulse beam 342 responsive to the data to be recorded.

Disk 312 rotates and the spots just recorded by beam 342 pass under the DRAW beam 344. Beam 344 is at a lower power level than beam 342 and does not heat tile material to a temperature above tile Curie temperature. The beam 382 has its plane of polarization rotated one way or the other depending upon the magnetic orientation of the recorded spots. This is known as the Kerr effect. In this way the DRAW beam 344 reads the data just written by beam 342. Reflected beams 380 and 382 return to the optical channel 328.

The DRAW servo beam 400 is completely separated from beam 398 by hologram 396 such that only the R/W servo beam 398 is used to provide the servo signals for focussing and tracking (see FIG. 15). When beam 342 is exactly focussed on medium 312, beam 398 will have a circular cross section 560 on detector 404. The sum of the amount of light hitting area C and D will be approximately equal to the sum of the amount of light hitting areas A, B, E and F, and will cause circuit 408 to generate a zero focus error signal. If beam 342 is slightly out of focus one way or the other, beam 398 will have a circular cross section 562 or 564 on detector 404. This change in circular cross section causes circuit 408 to generate a positive or negative focus error signal. The focus error signal is used by the focus servo 412 to control motor 366 to move lens 362 until the focus is again achieved.

If beam 342 is focussed exactly on a track of medium 12, then beam 398 will fall as a circular cross section 460 equally between sections A, C and E, and the sections B, D and F. If beam 342 is off track, beam 398 will fall more on sections A, C and E, and less on sections B, D and F, or visa versa. This displacement of the beam is caused by the tracking grooves on the optical disk 312 and is well known in the art. This displacement of the beam results in a positive or negative tracking error signal being produced by circuit 406. This tracking error signal is then used by the track and seek servo 410 to control motor 326 to move head 322 until the beam is once again on track. Holograms 430 and 440 separate the polarization component beams 424 and 426 into their separate R/W and DRAW beam components such that data detection may be achieved. The DRAW data beams 434 and 444 are detected by detectors 438 and 448, respectively, and data circuit 450 generates a DRAW data signal which is representative of the recorded data. Controller 460 uses the signal to verify that the data just written was accurately recorded. During the Write operation, the R/W data signal is ignored by controller 460.

During the Read operation, controller 460 causes laser control 464 to energize laser array 340 such that only the R/W beam 442 is produced. The power of beam 442 is adjusted such that it does not heat the medium of disk 312 to a temperature above its Curie temperature. This low power beam 442 is reflected by the disk 312 as beam 380. The R/W data beams 432 and 442 are detected by detectors 437 and 447, respectively, and data circuit 450 generates a R/W data signal.

While the invention has been particularly shown and described with reference to the preferred embodiments thereof, it will be understood by those skilled in the art that various other changes in form and detail may be made without departing from the spirit and scope of the invention.

What is claimed is:

1. A hologram system comprising:
    a first volume hologram having a plurality of Bragg planes, each Bragg plane set at an angle $\Phi_1$ relative to an exterior planar surface of the first volume hologram, and each Bragg plane spaced a distance $L_1$ apart;
    a second volume hologram having a plurality of Bragg planes, each Bragg plane set at an angle $\Phi_2$ relative to an exterior planar surface of the second volume hologram, and each Bragg plane spaced a distance $L_2$ apart, $\Phi_2$ being equal to $\Phi_1$ and $L_2$ being equal to $L_1$, the second volume hologram oriented with its Bragg planes parallel with the Bragg planes of the first volume holograms; and
    a means for optically coupling the first and second volume holograms.

2. The system of claim 1, wherein the first and second volume holograms have the same thickness.

3. The system of claim 1, wherein the combined thickness of the first and second volume holograms is T, where $T \geq 25$ microns.

4. The system of claim 1, further including a first and a second substrate in supporting relationship to the first and second holograms, respectively, the first and second substrates located on opposite sides of the first and second volume holograms.

5. The system of claim 1, wherein the optical coupling means is a radiation cured cement.

6. The system of claim 1, wherein the first and second volume holograms are made from separate pieces of a single volume hologram.

7. The system of claim 1, wherein the first and second volume holograms are made of dichromated gelatin.

8. The system of claim 1, wherein the first and second volume holograms comprise a hologram assembly, the hologram assembly for receiving a first radiation beam at a Bragg angle and diffracting the first radiation beam, and for receiving a second radiation beam at a non-Bragg angle and transmitting the second radiation beam undiffracted, the first and second radiation beams having an angle of deviation of less than 2° before entering the hologram assembly.

9. A hologram system comprising:
    a first substrate;
    a first volume hologram overlying the first substrate, the first volume hologram having a plurality of Bragg planes, each Bragg plane set at an angle $\Phi_1$ relative to an exterior planar surface of the first volume hologram, and each Bragg plane spaced a distance $L_1$ apart;
    a second substrate;
    a second volume hologram overlying the second substrate, the second volume hologram having a plurality of Bragg planes, each Bragg plane set at an angle $\Phi_2$ relative to an exterior planar surface of the second volume hologram, and each Bragg plane spaced a distance $L_2$ apart, $\Phi_2$ being equal to $\Phi_1$ and $L_2$ being equal to $L_1$, the second volume hologram being oriented with its Bragg planes parallel with the Bragg planes of the first volume hologram; and
    an optical cement connecting the first volume hologram to the second volume hologram.

10. The system of claim 9, wherein the first and second volume holograms have the same thickness.

11. The system of claim 9, wherein the combined thickness of the first and second volume holograms is T, where $T \geq 25$ microns.

12. The system of claim 9, wherein the first and second substrates are located on opposite sides of the first and second volume holograms.

13. The system of claim 9, wherein the optical cement is a radiation cured cement.

14. The system of claim 9, wherein the first and second volume holograms are made from separate pieces of a single volume hologram.

15. The system of claim 9, wherein the first and second volume holograms are made of dichromated gelatin.

16. The system of claim 9, wherein the first and second volume holograms comprise a hologram assembly, the hologram assembly for receiving a first radiation beam at a Bragg angle and diffracting the first radiation beam, and for receiving a second radiation beam at a non-Bragg angle and transmitting the second radiation beam undiffracted, the first and second radiation beams having an angle of deviation of less than 2° before entering the hologram assembly.

17. A method for making a hologram system comprising the steps of:
   positioning a first and a second volume hologram in optical communication with one another, the first and second volume holograms both having Bragg planes at the same angle and with the same Bragg plane spacing;
   rotationally moving the first and second volume holograms about a first axis perpendicular to the planar surfaces of the first and second volume holograms relative to one another until their respective Bragg planes are parallel;
   translationally moving the first and second volume holograms along a second axis parallel to the planar surfaces of the first and second volume holograms relative to one another until the desired amount of diffraction efficiency is achieved.

18. The method of claim 17, further comprising the step of securing the relative positions of the first and second volume holograms.

19. The method of claim 17, further comprising the step of placing a cement between the first volume hologram and the second volume hologram and curing the cement to bond the first and second volume holograms together.

20. The method of claim 19, wherein the cement is a radiation cured cement and the curing is achieved by directing radiation at the cement.

21. The method of claim 17, further including the step of passing a laser beam through the first and second volume holograms and measuring the diffraction of the laser beam in order to determine the alignment between the first and second volume holograms.

22. The method of claim 17, wherein the first and second volume holograms have the same thickness.

23. The method of claim 17, wherein the combined thickness of the first and second volume holograms is T, where $T \geq$ to 25 microns.

24. The method of claim 17, wherein the first and second volume holograms have a first and a second substrate in supporting relationship, respectively, the first and second substrates located on opposite sides of the first and second volume holograms.

25. The method of claim 17, wherein the first and second volume holograms are made from separate pieces of a single volume hologram.

26. The method of claim 17, wherein the first and second volume holograms are made of dichromated gelatin.

27. The method of claim 17, wherein the steps of rotationally and translationally moving the first and second volume holograms is done with the first and second volume holograms located in an optical stage.

28. A hologram system made using the process of claim 17.

29. A hologram system comprising:
   an optical data storage medium;
   a radiation source for generating two radiation beams having an angle of divergence;
   a transmission means for transmitting the two radiation beams to the medium;
   a reception means for receiving two reflected radiation beams from the medium; and
   a hologram assembly for receiving and separating the two reflected radiation beams comprising a first volume hologram having a plurality of Bragg planes, each Bragg plane set at an angle $\Phi_1$ relative to an exterior planar surface of the first volume hologram, and each Bragg plane spaced a distance $L_1$ apart, and a second volume hologram having a plurality of Bragg planes, each Bragg plane set at an angle $\Phi_2$ relative to an exterior planar surface of the second volume hologram, and each Bragg plane spaced a distance $L_2$ apart, $\Phi_2$ being equal to $\Phi_1$ and $L_2$ being equal to $L_1$, the second volume hologram oriented with its Bragg planes parallel with the Bragg planes of the first volume hologram, and means for optically coupling the first and second volume holograms.

30. The system of claim 29, wherein the first and second volume holograms have the same thickness.

31. The system of claim 29, wherein the combined thickness of the first and second volume holograms is T, where $T \geq 25$ microns.

32. The system of claim 29, further including a first and a second substrate in supporting relationship to the first and second holograms, respectively, the first and second substrates located on opposite sides of the first and second holograms.

33. The system of claim 29, wherein the optical coupling means is a radiation cured cement.

34. The system of claim 29, wherein the first and second volume holograms are made from separate pieces of a single volume hologram.

35. The system of claim 29, wherein the first and second volume holograms are made of dichromated gelatin.

36. The system of claim 29, wherein the hologram assembly for receiving a first radiation beam at a Bragg angle and diffracting the first radiation beam, and for receiving a second radiation beam at a non-Bragg angle and transmitting the second radiation beam undiffracted, the first and second radiation beams having an angle of deviation of less than 2° before entering the hologram assembly.

* * * * *

UNITED STATES PATENT AND TRADEMARK OFFICE
CERTIFICATE OF CORRECTION

PATENT NO. : 5,331,445
DATED : July 19, 1994
INVENTOR(S) : Dickson et al.

It is certified that error appears in the above-identified patent and that said Letters Patent is hereby corrected as shown below:

Column 1, line 60 delete " vex)", insert --very--.

Column 1, line 66 delete "tile", insert --the--.

Column 2, line 6 delete "ill", insert --in--.

Column 2, line 12 delete "tile", insert --the--.

Column 2, line 13 delete "tile", insert --the--.

Column 2, line 46 delete "an", insert --art--.

Column 4, line 27 delete equation , insert --$\alpha = asin(\sin\theta_I/n_o)$ --.

Column 4, line 43 delete "a sin", insert --asin--.

Column 4, line 48 delete "a sin", insert --asin--.

Column 5, line 10 delete "equation 1", insert -- $\alpha = asin[\frac{\sin(\theta_I)}{n_o}]$ --

UNITED STATES PATENT AND TRADEMARK OFFICE
CERTIFICATE OF CORRECTION

PATENT NO. : 5,331,445
DATED : July 19, 1994
INVENTOR(S) : Dickson et al.

It is certified that error appears in the above-indentified patent and that said Letters Patent is hereby corrected as shown below:

Column 6, line 5 delete "$n_1 320.0081$"
insert -- $n_1 = .0081$ --

Column 7, line 45 delete "a sin"
insert --asin--.

Column 7, line 47 delete "a sin"
insert --asin--.

Column 10, line 64 delete "tile"
insert --the--.

Column 10, line 65 delete "tile"
insert --the--.

Signed and Sealed this

Twenty-second Day of August, 1995

Attest:

BRUCE LEHMAN

Attesting Officer

Commissioner of Patents and Trademarks